United States Patent Office 3,132,171
Patented May 5, 1964

3,132,171
3,4-DIPHOSPHATOPHENYL-ALANINE AND
PROCESS FOR MAKING SAME
Herman Plaut, Los Angeles, Calif., assignor to Strong
Cobb Arner Inc., Cleveland, Ohio, a corporation of
New York
No Drawing. Filed June 18, 1962, Ser. No. 202,972
3 Claims. (Cl. 260—461)

This invention relates to a new composition of matter and in particular to an organic diphosphate diester compound, useful in the treatment of the mentally ill.

The object of this invention is to provide for a stable soluble, oral administrable derivative of 3,4-dihydroxyphenylalanine which has anti-depressive action.

A further object of this invention is to provide processes for the synthesis of this compound.

In accordance with my present invention, I have succeeded in forming a diphosphate derivative of 3,4-dihydroxyphenylalanine, which I call Dopadiphosphate, for short and having the generic name 3,4-dihydroxyphenylalanine diphosphate, this having the formula:

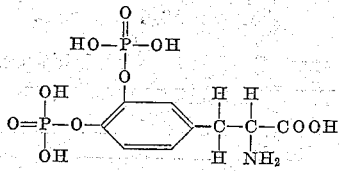

This compound, is readily water-soluble and stable in aqueous solutions, and is not affected by mild oxidizing agents such as atmospheric oxygen, in contradistinction to 3,4-dihydroxyphenylalanine. This latter compound, at pH 8 in aqueous solution, is rapidly attacked and destroyed by atmospheric oxygen, and further suffers from a very low solubility in an aqueous solution of pH 3-6. Therefore it must be administered as salts, at a pH of 8 or above where it is rapidly attacked by atmospheric oxygen. Dopadiphosphate suffers from none of these disadvantages. It is rapidly converted at the site of action in the body into 3,4-dihydroxyphenylalanine by the phosphorases present in these tissues where it exerts the desired potent anti-depressive activity.

I have discovered that I can prepare dopadiphosphate by several methods.

In the first method dihydroxyphenylalanine is esterified with poly-phosphoric acid, as such, or made by mixing 85% phosphoric acid with phosphorous pentoxide and heating 50–100 deg. C. for about one hour.

Dopadiphosphate may then be isolated by ion exchange techniques wherein the product is absorbed on a basic resin. After the excess phosphoric acid is removed by water washing, the dopadiphosphate is eluted with a weak volatile basic system.

In a further method, N-carbobenzyloxy-3,4-dihydroxyphenylalanine benzl ester was the starting material. It could be reacted with the usual phosphorylating agents, such as phosphorous oxychloride or diphenylphosphochloridate to give an intermediate which yielded dopadiphosphate when the blocking groups were simultaneously removed by catalytic hydrogenation.

In order to indicate even more fully the nature of the present invention the following specific examples are set forth. It will be understood that these examples are presented for illustrative purposes only, and that they are not intended to limit the scope of the invention in any manner.

Example I 15 grams of 3,4-dihydroxyphenylalanine is mixed with 125 grams of 100% polyphosphoric acid and the mixture heated on a steam bath and maintained between 65–85 deg. C. for 1 hour. On cooling, the syrup was quenched on 1500 grams of ice to yield a clear solution. This was passed through a column 1 inch in diameter and 20 inches high of IR–120, H+ form, 8% cross-linked, 50–100 mesh size. The column was then washed with distilled water until the pH of the effluent solution rose above 4, indicating that the excess phosphoric acid had been removed. The dopadiphosphate was then eluted with 0.25 N NH₄OH solution, and all the ninhydrin positive fractions were collected and pooled. These fractions were then concentrated under reduced pressure at a temperature below 40 deg. C. to a volume of about 50 ml. The addition of 450 ml. anhydrous ethanol led to the rapid precipitation of white needles. Further recrystallization by solution in the minimum amount of 40 deg. C. water and precipitation with 10 volumes of anhydrous ethanol, yielded an analytically pure product in 65% yield, melting at 147 deg. C.

Example II

An alternative procedure started with 15 grams of 3,4-dihydroxyphenylalanine which was mixed with 100 grams of 85% phosphoric acid and 20 grams of phosphorous pentoxide and heated on the steam bath for 1 hour. After quenching on 1.5 kilos of ice the excess phosphoric acid was removed by adding a solution of barium hydroxide until the pH of 8 was attained.

The filtrate, after removing the precipitated barium phosphate, was concentrated under reduced pressure at a temperature below 40 deg. C., to a volume of 100 ml. Ethanol, added to this solution, yielded an immediate precipitate of the barium salt and the dopadiphosphate, which was collected. The salt was converted to the free acid by solution in water and then treated with the stoichiometric amount of 0.25 N sulfuric acid. The precipitated barium sulfate was removed and the dopadiphosphate was isolated by concentration and precipitated with ethanol, as described in Example I above. The overall yield was 48%.

A typical elemental analysis gave:

|  | Theoretical | Found |
| --- | --- | --- |
| Carbon | 30.26 | 30.42 |
| Hydrogen | 3.66 | 3.71 |
| Phosphorus | 13.77 | 13.41 |

The phosphomolybdate test for inorganic phosphorus after dissolving dopadiphosphate in water (very acid) was negative at 0 time, gradually becoming more positive after one hour, indicating slow hydrolysis in strongly acid solution. In neutral solutions the sodium salt of dopadiphosphate was stable.

Hydrolysis in 1 N HCl at 95 deg. C. for one hour gave free 3,4-dihydroxyphenylalanine and inorganic phosphate. The Folin test was negative and the ninhydrin test was positive for dopadiphosphate, showing the phenol hydroxyl groups were blocked and the amino group free. After acid hydrolysis, as described above, paper chromatography in butanol-acetic acid-H₂O; 80% phenol-20% H₂O; and 1:1 tertiary butanol–6 N NH₄OH followed by drying, spraying with ninhydrin and heating, gave R_f values identical to that of authentic free 3,4-dihydroxyphenylalanine run simultaneously.

Enzymatic hydrolysis by alkaline phosphatase at 37 deg. C. in 0.1 N phosphate buffer under nitrogen at pH 4.5 and pH 7.0 for 15, 30 and 60 minutes gave a linear increase with time of incubation of free 3,4-dihydroxyphenylalanine, as tested by the citrate-molybdate colorimetric test for catechols and by paper chromatography on Whatman #1, developed by the descending technique with isopropanol:acetic acid: H₂O, 70:5:25 (v./v./v.), and sprayed with ninhydrin in one case, and in another, N-2 6-trichloro-p-benzoquinoneimine (0.1% w./v. in anhydrous ethanol) followed by 2% borate buffer, pH 9.5, gave $R_f$'s and colors, as well as the same fluorescence (of unsprayed runs) under ultraviolet light, as authentic 3,4-dihydroxyphenylalanine run of the same papers simultaneously. Unhydrolyzed dopadiphosphate run simultaneously gave no such test.

In animals pretreated with a monoamine oxidase inhibitor, iproniazid and reserpine, which are completely sedated and with ptosis and hypothermia, injections of free 3,4-hydroxyphenylalanine typically elevate the temperature, and counteracts the ptosis and sedation, causing arousal and increased body activity. This is due to increased levels of dopamine (and, to a less extent, norepinephrine) in the brain, formed from the 3,4-dihydroxyphenylalanine by decarboxylation (and subsequent 8-hydroxylation in the case of norepinephrine). Dopadiphosphate, when injected into animals, is hydrolyzed by alkaline phosphatase to 3,4-dihydroxyphenylalanine, which is then decarboxylated as fast as this hydrolysis occurs. My dopadiphosphate was observed to have the same effects in such animals as 3,4-dihydroxyphenylalanine, but less rapidly, because of the phosphatase hydrolysis being necessary before decarboxylation. Spectrofluorophotometric analysis of the brain, heart and other tissues by modifications of the method of Shore et al., J. Pharmacol. Exp. Thereap. 122: 295, 1958, showed increased levels of dopamine five to sixty minutes after injecting dopadiphosphate. This is enhanced by pretreatement of the animals with a monoamine oxidase inhibitor such as iproniazid.

My new compound, dopadiphosphate should be useful in the treatment of psychic depression as well as certain basal ganglion diseases such as Parkinson's disease and Runtington's chorea. It may also be of value in the treatment of certain cardiovascular disorders such as pastural hypotension, defective sympathetic-nerve-mediated control of cardiac rate changes, and angina pectoris.

While there has been disclosed and described what is at present considered to be the preferred embodiment of the invention, it will, of course, be understood that many modifications and changes and substitutions may be made therein without departing from the true scope of the invention as defined in the appended claims.

I claim:

1. A composition of matter, 3,4-dihydroxyphenylalanine diphosphate, having the structural formula:

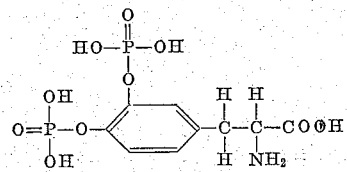

2. A method of producing the composition of matter of claim 1 by esterfying 3,4-dihydroxyphenylalanine with a mixture of phosphoric acid and phosphorus pentoxide.

3. A method of producing the composition of matter of claim 1 by esterfying 3,4-dihydroxyphenylalanine with a mixture of 85% phosphoric acid and phosphorous pentoxide and heating between 50–100 deg. C.

References Cited in the file of this patent

UNITED STATES PATENTS

| | | |
|---|---|---|
| 2,320,588 | Graenacher et al. | June 1, 1943 |
| 2,963,506 | Lewinski | Dec. 6, 1960 |
| 3,008,951 | Ferno et al. | Nov. 14, 1961 |